(12) United States Patent
Resendes

(10) Patent No.: US 9,689,512 B2
(45) Date of Patent: Jun. 27, 2017

(54) AIR HOSE DELIVERY ASSEMBLY WITH INNER LINER

(75) Inventor: Mark David Resendes, Dixon, CA (US)

(73) Assignee: HOBART BROTHERS COMPANY, Troy, OH (US)

( * ) Notice: Subject to any disclaimer, the term of this patent is extended or adjusted under 35 U.S.C. 154(b) by 2220 days.

(21) Appl. No.: 12/689,931

(22) Filed: Jan. 19, 2010

(65) Prior Publication Data

US 2010/0212768 A1     Aug. 26, 2010

Related U.S. Application Data

(60) Provisional application No. 61/154,082, filed on Feb. 20, 2009.

(51) Int. Cl.
| F16L 11/00 | (2006.01) |
| F16L 11/02 | (2006.01) |
| F16L 11/12 | (2006.01) |
| F16L 59/153 | (2006.01) |
| B64F 1/36 | (2017.01) |

(52) U.S. Cl.
CPC ............. *F16L 11/02* (2013.01); *F16L 11/12* (2013.01); *F16L 59/153* (2013.01); *B64F 1/364* (2013.01)

(58) Field of Classification Search
USPC .............. 138/128, 129, 149, 151, 152, 169, 138/DIG. 4, 109, 114
See application file for complete search history.

(56) References Cited

U.S. PATENT DOCUMENTS

| 3,948,295 | A | * | 4/1976 | Lemont et al. ............... 138/147 |
| 3,996,968 | A | * | 12/1976 | Bergman et al. ............. 138/118 |
| 4,208,373 | A | * | 6/1980 | Matovich ..................... 422/129 |
| 4,478,661 | A | * | 10/1984 | Lewis ............................ 156/92 |
| 5,575,312 | A | * | 11/1996 | Schroeder .................... 138/149 |
| 5,640,951 | A | * | 6/1997 | Huddart et al. ......... 128/204.17 |
| 5,712,010 | A | * | 1/1998 | Russek et al. ............... 428/36.3 |
| 5,947,158 | A | * | 9/1999 | Gross et al. .................. 138/149 |
| 6,129,107 | A | * | 10/2000 | Jackson ........................ 137/312 |
| 6,240,968 | B1 | * | 6/2001 | Bigonzi-Jaker et al. ..... 138/115 |
| 6,304,698 | B1 | * | 10/2001 | Morris ......................... 385/100 |
| 6,571,833 | B1 | * | 6/2003 | McLarty et al. ............. 138/116 |
| 6,610,928 | B2 | * | 8/2003 | Synder ......................... 174/68.3 |
| 7,086,422 | B2 | * | 8/2006 | Huber et al. ................. 138/149 |
| 7,325,576 | B2 | * | 2/2008 | Peterson ...................... 138/115 |
| 8,291,941 | B1 | * | 10/2012 | Berardi ........................ 138/118 |
| 2002/0117852 | A1 | * | 8/2002 | Jenum .......................... 285/260 |
| 2002/0157718 | A1 | | 10/2002 | Mason |
| 2003/0098084 | A1 | * | 5/2003 | Ragner et al. ................ 138/129 |
| 2006/0180227 | A1 | | 8/2006 | Hummel et al. |
| 2008/0185064 | A1 | | 8/2008 | Kolzumi et al. |
| 2009/0114300 | A1 | * | 5/2009 | Shyu .............................. 138/39 |

* cited by examiner

*Primary Examiner* — James Hook
(74) *Attorney, Agent, or Firm* — Fletcher Yoder P.C.

(57) ABSTRACT

An air hose delivery assembly includes an external conduit. The air hose delivery assembly also includes a continuous inner liner disposed within the external conduit. The continuous inner liner is secured to the external conduit only at the ends of the continuous inner liner to form a tubular structure that is configured to be collapsed to a flat structure.

20 Claims, 3 Drawing Sheets

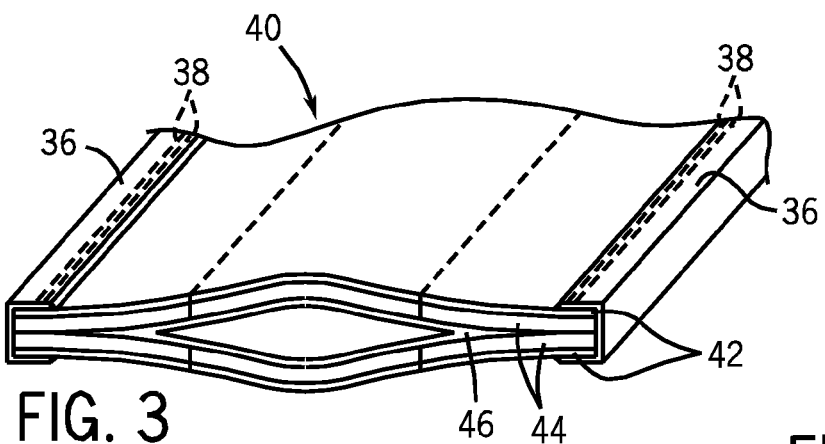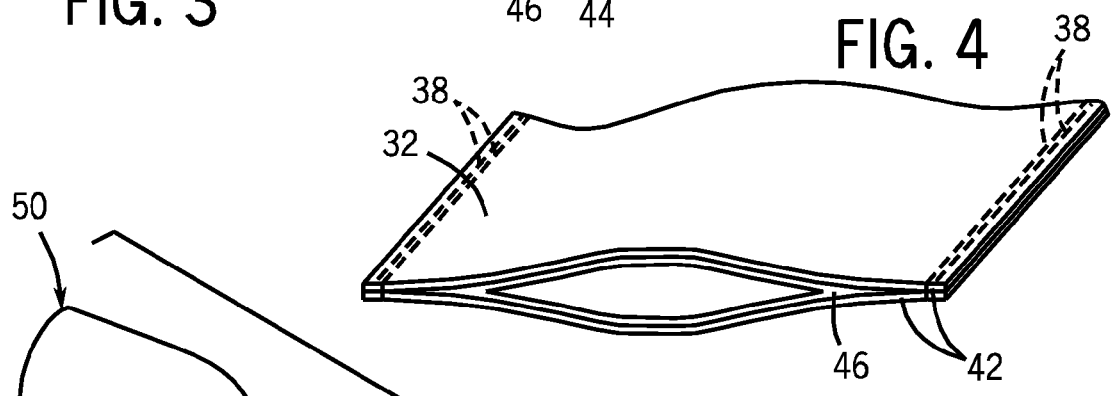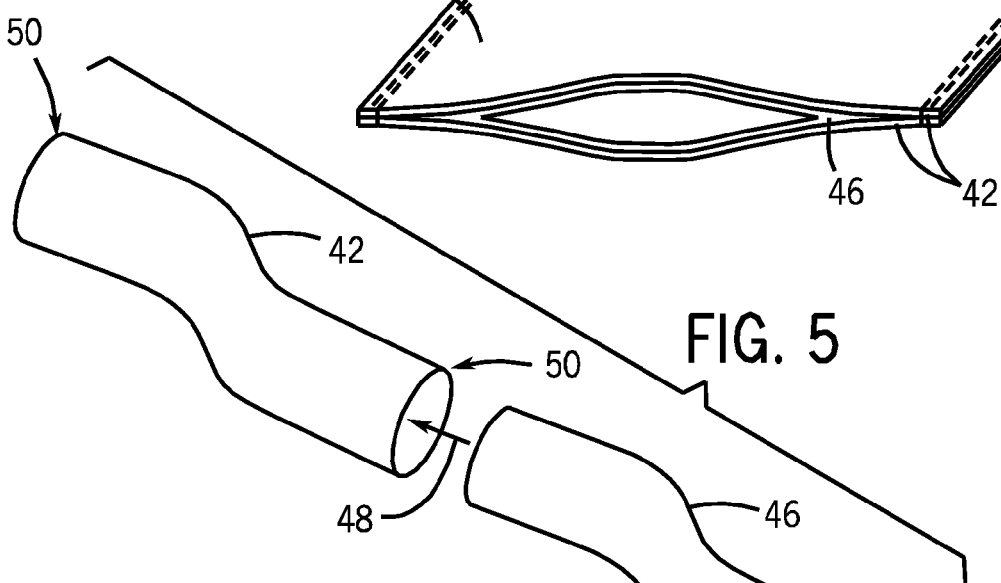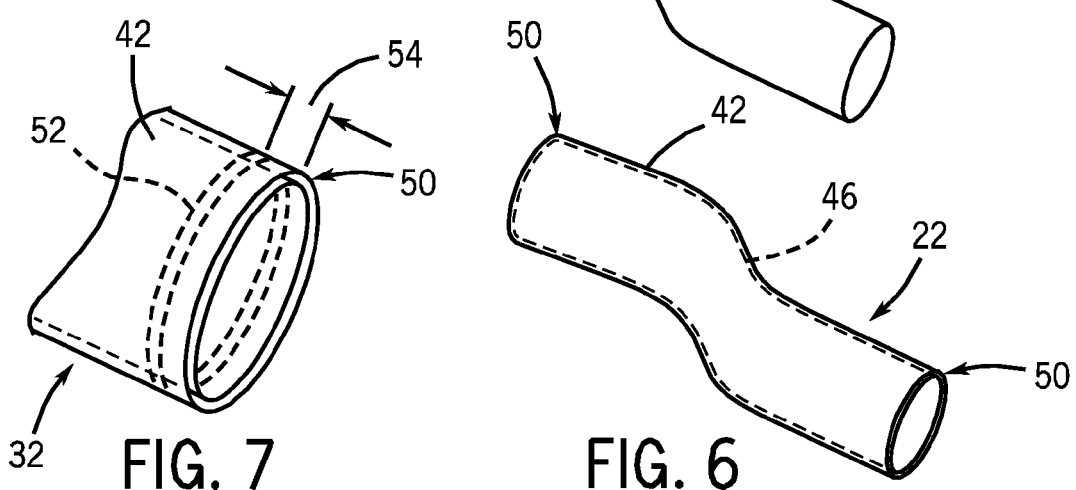

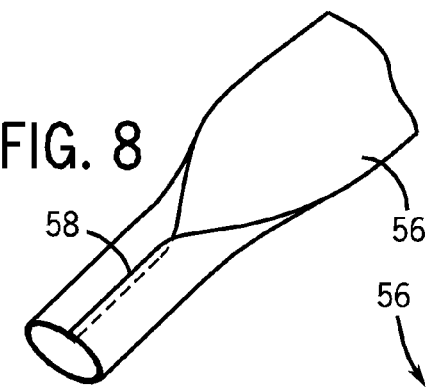
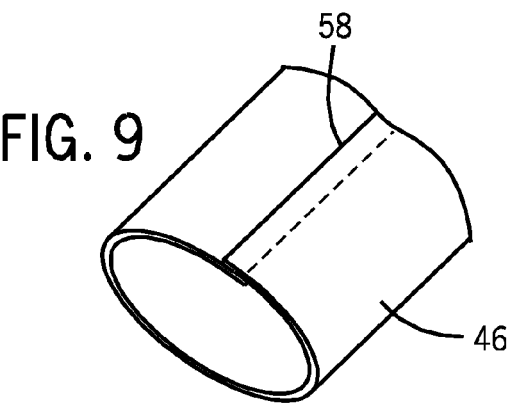
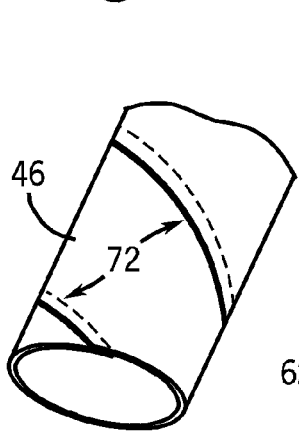
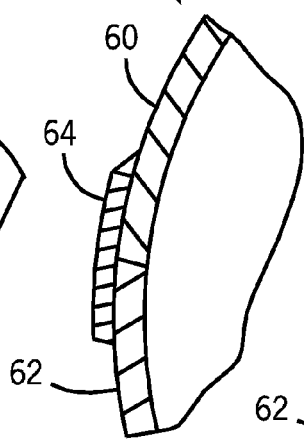
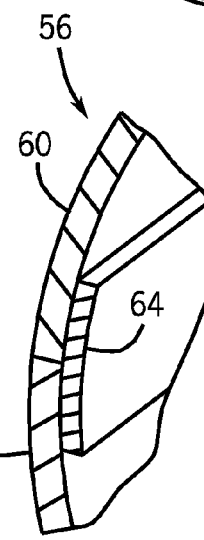
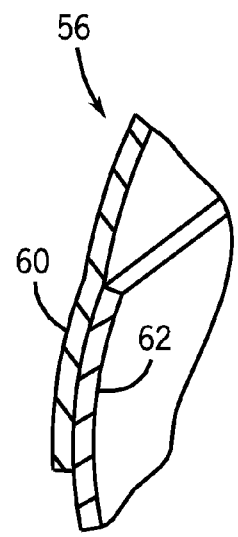
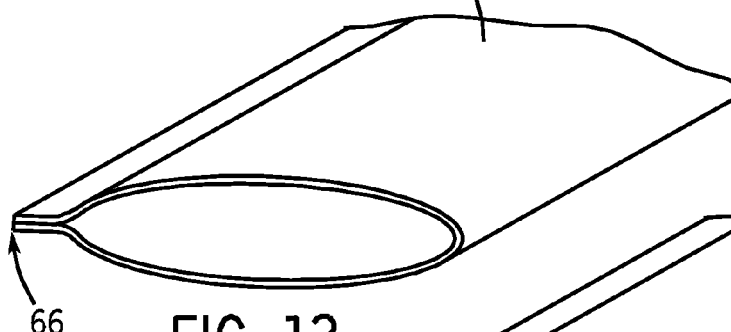
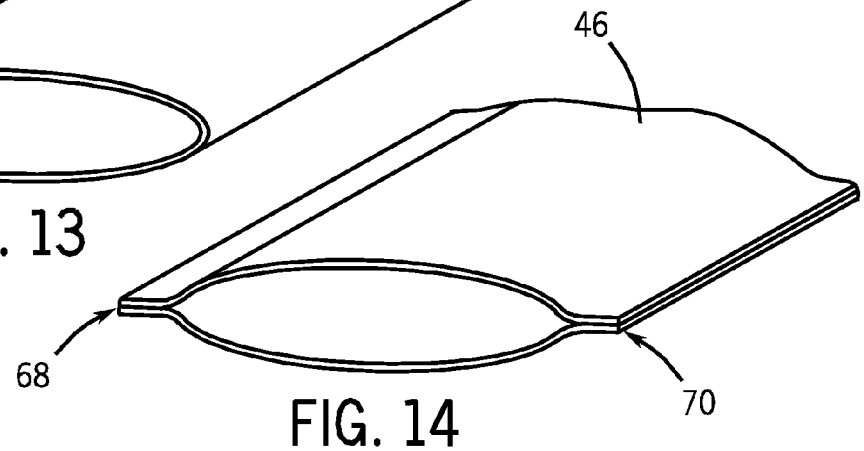

AIR HOSE DELIVERY ASSEMBLY WITH INNER LINER

CROSS REFERENCE TO RELATED APPLICATIONS

This application is a Non-Provisional Patent Application of U.S. Provisional Patent Application No. 61/154,082, entitled "High Pressure, Lay Flat, Pre-Conditioned Air Hose", filed Feb. 20, 2009, which is herein incorporated by reference.

BACKGROUND

The invention relates generally to an air hose assembly, and more particularly, to a hose assembly that facilitates the transfer of preconditioned air from an air delivery system to a destination, such as an aircraft.

Prior to and after flights, aircraft often spend a considerable amount of time on the ground to load passengers, repair or replace parts, load equipment, and so forth. Electrical power is often required to support such activities. However, grounded aircraft often have their engines shut down and, therefore, are unable to provide power for electrical systems, air conditioning systems, and the like. Even when the engines are run, such as to provide control power for electronics, the air conditioning systems may not be run, or may be insufficient to cool the pilot and/or passengers, and to maintain electronics and other support equipment at desired temperatures. Accordingly, when grounded, traditional aircraft systems are temporarily connected to a variety of ground support equipment. Such equipment may be mounted on portable carts that are placed in close proximity to the grounded aircraft or may be built into a terminal, passenger boarding bridge, or hangar. Ground support equipment typically includes an air conditioning unit capable of providing conditioned air to maintain the aircraft electronics, pilots, passenger cabins, equipment, and so forth at desired temperatures.

To supply conditioned air to a parked aircraft from an external preconditioned air source (e.g., ground support equipment, pits, rafters, etc.), the aircraft must be connected to the preconditioned air source via a duct or hose. Such air hoses can be rather large to accommodate the necessary airflow to control the environment in a large aircraft. In addition, because the aircraft cannot always be brought into close proximity with the preconditioned air source, some hoses must be quite long. Accordingly, these hoses are often outfitted with coatings or glues to prevent air leakage as the conditioned air is transferred along the length of the hose to the aircraft. However, current systems often disrupt the flow of conditioned air, resulting in air leakage that reduces the efficiency of the conditioned air transfer. Moreover, the construction of conventional air conduits for aircraft typically includes many stitched components that simply do not avoid leaking, and that may leak considerably.

In some systems, such as high performance aircraft, electronics may require special cooling, and closed loop air conditioner control may be used. Depending upon the temperature requirements, such systems may demand considerable air flow, resulting in relatively higher pressures than other systems. Existing air conduits are simply unable to withstand such pressures, particularly given their sewn construction.

Accordingly, there exists a need for systems that address this problem.

BRIEF DESCRIPTION

In one exemplary embodiment, an air hose delivery assembly includes an external conduit. The air hose delivery assembly also includes a continuous inner liner disposed within the external conduit and secured to the external conduit only at the ends of the continuous inner liner to form a tubular structure configured to be collapsed to a flat structure.

In a second embodiment, an air hose delivery assembly includes an outer layer with a first end. The air hose delivery assembly also includes a continuous liner with a second end. The continuous liner is joined with the outer layer exclusively via attachment of the first end to the second end.

In a third embodiment, an inner layer for an air hose delivery assembly includes a continuous liner securable to one or more additional layers only at an end of the continuous liner. The continuous liner is formed via sealing at least one edge of a piece of liner material to form a tubular structure that is configured to be collapsed to a flat structure.

DRAWINGS

These and other features, aspects, and advantages of the present invention will become better understood when the following detailed description is read with reference to the accompanying drawings in which like characters represent like parts throughout the drawings, wherein:

FIG. 3 is a cross-sectional view of the flat section of the hose assembly of FIG. 1, taken along line 3-3 of FIG. 2 in accordance with embodiments of the present invention;

FIG. 4 is a cross-sectional view of the flat section of the hose assembly of FIG. 1, taken along line 4-4 of FIG. 2 in accordance with embodiments of the present invention;

FIG. 5 illustrates placement of a continuous inner liner inside an external conduit to form an embodiment of the hose assembly in accordance with embodiments of the present invention;

FIG. 6 illustrates a flat section of an exemplary embodiment of the hose assembly of FIG. 5 after the continuous liner has been placed inside the external conduit;

FIG. 7 is a perspective view of an end portion of a hose assembly illustrating securement of a continuous liner to an external conduit in accordance with embodiments of the present invention;

FIG. 8 illustrates an exemplary method of forming a liner material into a hose shape of a desired inner diameter in accordance with embodiments of the present invention;

FIG. 9 is a perspective view of the liner material of FIG. 8 after heat sealing in accordance with embodiments of the present invention;

FIG. 10 illustrates attachment of open ends of a liner material via an externally located connector in accordance with embodiments of the present invention;

FIG. 11 illustrates attachment of open ends of a liner material via an internally located connector in accordance with embodiments of the present invention;

FIG. 12 illustrates attachment of overlapping open ends of a liner material via a heat seal in accordance with embodiments of the present invention;

FIG. 13 is a perspective view of an exemplary embodiment of a continuous inner liner formed from a single piece of liner material;

FIG. 14 is a perspective view of an exemplary embodiment of a continuous inner liner formed from two pieces of liner material; and FIG. 15 illustrates an exemplary hose shaped continuous liner formed from one or more pieces of liner material joined together in a spiral pattern in accordance with embodiments of the present invention.

DETAILED DESCRIPTION

As described in detail below, various embodiments of a preconditioned air hose assembly including an external conduit and a continuous inner liner secured to the external conduit only at the ends are provided. That is, the continuous inner liner may be "floating" with respect to the external conduit except at the ends where it is attached (the term "floating" referring to the fact that the liner is attached only at the ends and not along its length). Exclusive securement of the inner liner at the ends may facilitate the easy replacement or repair of the inner liner when damage occurs. In some cases, the liner may be secured to the conduit along its length, but preferably not by a technique that would puncture the liner or otherwise cause air from the liner to leak to the surrounding conduit. The continuous inner liner is capable of allowing the transfer of conditioned air while minimizing air leakage, facilitating efficient flow of the conditioned air through the air hose assembly, and maintaining durability during high pressure conditions, among other things. To this end, the continuous inner liner may be formed from one or more pieces of liner material with one or more edges secured via a heat seal, adhesive, and so forth. Additionally, in some embodiments, an insulating layer may be disposed between the external conduit and the continuous inner liner. In such embodiments, the external conduit may be secured to the insulating layer via a double stitched webbing, and the inner liner may be floating with respect to the insulating layer.

Figure 1:
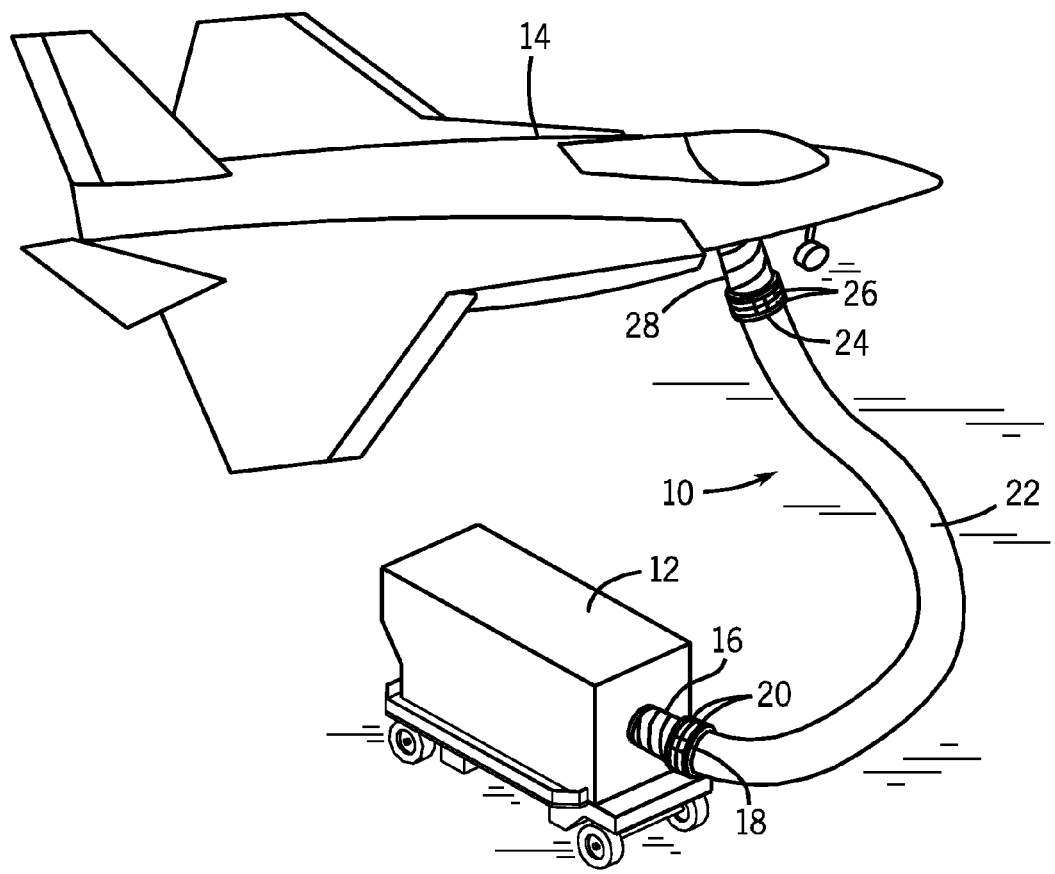
FIG. 1 is a perspective view of an aircraft connected to an air hose delivery system via a hose assembly in accordance with an embodiments of the present invention.

Turning now to the drawings, FIG. 1 illustrates a preconditioned air hose assembly 10 that is configured to couple an air delivery system 12 to an aircraft, in this case a high performance military aircraft 14. The air hose assembly 10 delivers preconditioned air to the aircraft 14 to alleviate the need to use the air conditioning system of the aircraft itself while the aircraft 14 is parked, or to supplement any on-board air conditioning that may be inadequate for the needed cooling when the aircraft is on the ground. Such preconditioned air may be beneficial for temperature regulation of electronics and/or aircraft personnel while the aircraft 14 is grounded. Aircraft 14, which may be a commercial, military or private aircraft, is illustrated as it may be parked on the ground, such as at a terminal or other facility. The ground is generally a tarmac, runway, or hangar floor, but could be any surface on which an aircraft is parked (e.g., the deck or hold of a ship). While FIG. 1 illustrates the hose assembly 10 for use with a military aircraft 12, it should be appreciated by one skilled in the art that hose assembly 10 may be used with any of a variety of types of aircrafts, such as commercial jets, and in various other settings, such as during their construction.

It should be noted that while FIG. 1 illustrates the hose assembly in the context of a ground support cart coupled to an aircraft, embodiments of the hose assembly may also be used in any of a variety of other types of systems designed to deliver conditioned air to an aircraft. For example, the hose assembly may be employed in air delivery systems that include a pit for a hanger. That is, the hose assembly may be configured to exit a pit located below an aircraft, plug into the aircraft, and provide conditioned air from a location below the aircraft. For further example, the hose assembly may be adapted for use from rafters in a ceiling. In such embodiments, the hose assembly may provide conditioned air from above the aircraft. Indeed, the hose assembly may be configured for use with any air delivery system and managed in a variety of ways. To that end, the hose assembly may be wrapped around a drum for storage or use, used from a position on a floor, wall, or ceiling, and so forth.

The illustrated air hose assembly 10 includes a first reinforced section 16, a first connector 18 with fasteners 20, a flat section 22, a second connector 24 with fasteners 26, and a second reinforced section 28. In further embodiments, the air hose assembly 10 may include any number and combination of reinforced sections and/or flat sections, depending on the design specifications for the desired assembly. The flat section 22 may include a variety of layers configured to cooperatively function to facilitate the transfer of preconditioned air from the air delivery system 12 to the aircraft 14. To that end, the flat section 22 may include a novel continuous liner that is exclusively secured at the ends of the flat section 22 as discussed in detail below. In certain embodiments, such a continuous liner may optimize the flow of the preconditioned air throughout the air hose assembly 10 due to reduced friction and turbulence as compared to traditional systems, with minimal loss of air through punctures created during manufacture. It should be noted that although the continuous liner is described herein in the context of a lay flat preconditioned air hose, embodiments of the continuous liner may be coupled to any conditioned air delivery system, such as rigidified hoses including wire wound designs.

The air delivery system 12 may, for example, be a mobile ground power unit as illustrated in FIG. 1. Alternatively, the air delivery system 12 may include equipment that is attached to a passenger bridge or to a fixed location, such as the terminal building. The air hose assembly 10 is typically moved out of the way of the aircraft when the aircraft is in motion, such as when it taxies to and from a terminal. When aircraft 14 is parked, air hose assembly 10 is moved into proximity and connected to aircraft 14, thus connecting the air delivery system 12 and aircraft 14. Before aircraft 14 begins moving, air hose assembly 10 is detached from aircraft 14 and moved away so that it is not in the path of aircraft 14 or so that it can be used to couple air delivery system 12 to another aircraft. Alternatively, air hose assembly 10 may be detached from aircraft 14 and left on the ground such that aircraft or other vehicles may run over the flat section 22.

Figure 2:
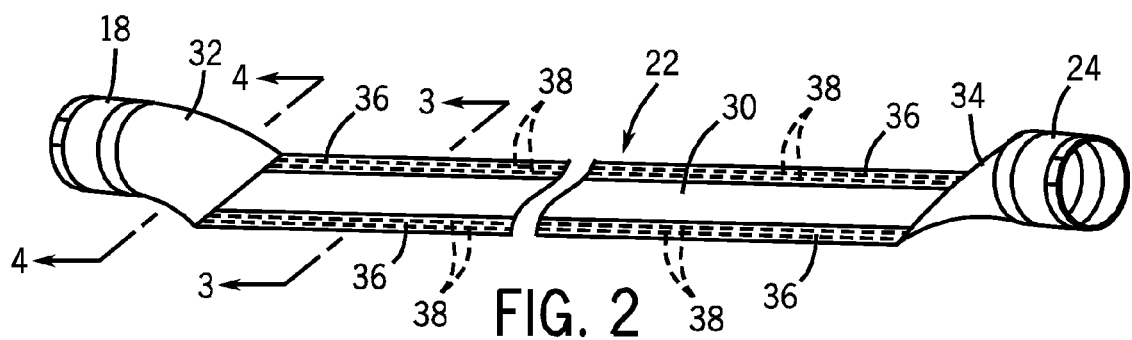
FIG. 2 illustrates an exemplary embodiment of a flat section of the hose assembly of FIG. 1 in more detail.

FIG. 2 illustrates the flat section 22 of the hose assembly 10 in more detail. The flat section 22 includes a middle portion 30, a first end portion 32, and a second end portion 34. The first end portion 32 and the second end portion 34 terminate in the first connector 18 and the second connector 24, respectively. In the illustrated embodiment, a webbing 36 is positioned along the lengthwise edges of the middle portion 30 to secure the external layer of the middle portion 30 on both the top and bottom of the flat section 22 of the hose assembly 10. A double stitched seam 38 is sewn down the length of each webbing 36 such that the webbing 36 and the layers of the middle portion 30 are joined together. To this end, the middle portion 30 may include a multi-layer assembly configured to function cooperatively to facilitate the flow of preconditioned air lengthwise through the flat section 22 of the hose assembly 10 during use. For instance, the middle portion 30 may include an inner layer that includes the floating continuous liner sealed at its ends. That is, in such embodiments, the floating continuous liner may not be secured to the other layers with the webbing 36 and double stitching 38, but may be secured only at the first end portion 32 and the second end portion 34. As will be appreciated by those skilled in the art, the connectors are typically secured to the ends of the conduit by insertion of the connectors into the ends and securement of bands around the conduit. These may be removable for servicing or changing the connectors, or the conduit, or for replacement of the liner as discussed below.

FIG. 3 is a cross sectional view of the middle portion 30 of the flat portion 22 of the hose assembly 10 taken along line 3-3 of FIG. 2. That is, FIG. 3 illustrates an exemplary multi-layered assembly that may make up the middle portion 30 of the flat section 22. In this embodiment, the multi-layered assembly 40 includes an outer layer or external conduit 42, an insulative layer 44, and a continuous liner 46. The external conduit 42 and the insulation 44 are secured together with webbing 36 and double stitching 38 as previously described. The continuous liner 46, on the other hand, is floating with respect to the secured outer layer 42 and the secured insulative layer 44. That is, the continuous liner 46 is not secured to layers 42 and 44 in the middle portion 30 of the flat section 22. Rather, the continuous inner liner 46 is only secured at the first end portion 32 and/or the second end portion 34. Such a feature may have the effect of facilitating easy repair of components of the flat section 22 of the hose assembly 10 when damage occurs. For example, if the continuous liner 46 becomes damaged (e.g., develops rips or holes) during use, the liner may be unsecured from the first end portion 32 and/or the second end portion 34 and subsequently replaced or repaired without replacing the entire flat section 22.

During use, the outer layer 42 is configured to facilitate the durability of the flat section 22 of the hose assembly 10. To that end, the outer layer 42 may be made of any suitable material capable of serving as an appropriate outer shell. For instance, the outer layer 42 may be made of a flexible fabric material such as Cordura® brand nylon fabric. Furthermore, the outer layer 42 may have a waterproof coating, such as polyurethane, configured so that moisture may pass through outer layer 42 in only one direction toward the outside of the hose assembly 10. The insulative layer 44 cooperates with the outer layer 42 to ensure that the preconditioned air is maintained within the hose assembly 10 as it traverses through the flat section 22. To that end, the insulative layer 44 may be made of any suitable lightweight insulation material, such as fiberglass, Astro-foil, foil bubble wrap, and so forth. Finally, the continuous liner 46 facilitates flow through and reparability of the flat section 22 while minimizing the leakage of preconditioned air. Therefore, the continuous liner may be made of any suitable material, such as CC580 as per the AS38386 U.S. military specification. In certain embodiments, the particular materials for each layer may be determined based on the demands of the given application.

FIG. 4 is a cross sectional view of the first end portion 32 of the flat portion 22 of the hose assembly 10 taken along line 4-4 of FIG. 2. That is, FIG. 4 illustrates an exemplary multi-layered assembly that may make up the first end portion 32 of the flat section 22. As illustrated, the first end portion 32 includes the outer layer 42 and the continuous liner 46. The outer layer is secured together via double stitching 38 while the inner liner 46 is floating with respect to the outer layer 42. That is, the continuous liner 46 is secured only at the end of the first end portion 32 as described in greater detail below.

FIGS. 5 and 6 illustrate placement of the continuous inner liner 46 inside the outer layer 42 to form an embodiment of the hose assembly 10. Specifically, FIG. 5 illustrates continuous liner 46 positioned for placement into external conduit 42, as indicated by arrow 48. FIG. 6 illustrates the flat section 22 of the hose assembly 10 after the continuous liner 46 has been placed inside the external conduit 42. Such a placement of the continuous liner 46 may occur during manufacturing of the flat section 22 of the hose assembly 10. After placement inside external conduit 42, inner liner 46 may be secured to external conduit 42 via double stitching at one or both of the ends 50 of the outer layer 42. The inner liner 46 may subsequently be unsecured from one or both of the ends 50 of the outer layer 42 for removal. Such a feature may facilitate easy replacement or repair of the liner 46 without the need to replace all the layers of the flat section 22 when damage occurs.

FIG. 7 is a perspective view of the first end portion 32 of the flat section 22 of the hose assembly 10, illustrating the securement of the continuous liner 46 to the external conduit 42 at the end of the flat section 22 in more detail. As used herein, the "end" of the flat section 22 at which the continuous liner is secured may be defined as a distance from the extreme edge of the first end portion 32 or the second end portion 34 that is less than approximately 1%, 2%, 3%, 4% or 5% of the total length of the flat section 22. For example, in FIG. 7, the continuous liner 46 is secured via double stitching 52 to the external conduit 42 at a distance 54 from the end 50 of the first end portion 32. For further example, in embodiments in which the total length of the flat section 22 is approximately equal to 15 ft, distance 54 may be equal to approximately 4% of the total length of the flat section 22, which is approximately 8". In another embodiment of a 15 foot length flat section 22, distance 54 may be equal to approximately ⅛". In further embodiments, the total length of the flat section 22 may be any of a variety of suitable lengths, such as 15 ft, 30 ft, 45 ft, and so forth.

FIGS. 8 and 9 illustrate an exemplary method of forming the liner material 56 into a hose shape of the desired inner diameter. In the illustrated embodiment, the open sides of the liner material 56 are folded over and secured to one another at a high temperature via a heat welding process, thus forming the liner material 56 into the hose shaped continuous liner 46. As the open sides of the material 56 are secured to one another, a seal 58 is formed. In some embodiments, the seal 58 may be a heat weld seal configured to withstand extreme cold or hot temperatures during use. In further embodiments, the seal 58 may include any other suitable adhesive material such that the open sides of the liner material 56 are secured together. For example, in a presently contemplated embodiment, the liner may be made of a coated material, such as polyvinylchloride, the coating of which may be melted for heat welding. The resulting joint and seal are very robust and withstand the stresses resulting from pressure applied to the interior of the liner, particularly when supported by the outer conduit structure.

FIGS. 10, 11, and 12 further illustrate a variety of suitable ways of forming a tubular or hose shape from one or more pieces of liner material 56. In particular, FIG. 10 shows an embodiment in which a first open end 60 and a second open end 62 of a single piece of liner material 56 are joined together via a connector 64. That is, connector 64 runs lengthwise along an exterior of the liner material 56, thus joining open end 60 and open end 62. This connector may be made of the same or a different material, and may be fixed to overlapping or non-overlapping edges of the liner material by heat welding, adhesives, and so forth. While the embodiment of FIG. 11 also includes connector 64 that joins open end 60 and open end 62, in this embodiment, the connector 64 is disposed lengthwise along an interior of the liner material 56. Finally, in the embodiment of FIG. 12, the first open end 60 and the second open end 62 of the liner material 56 are overlapped and sealed together via heat welding or other adhesive techniques. It should be noted that in further embodiments, the first open end 60 and the second open end 62 of FIGS. 10, 11, and 12 may also represent a first piece of liner material and a second piece of liner material, respectively. That is, the previously described methods of joining two ends of one piece of liner material may be equally applicable to joining the ends of two distinct pieces of liner material.

FIG. 13 illustrates an exemplary embodiment of the hose shaped continuous liner 46 formed from a single piece of liner material. In this embodiment, the open ends of the liner material are joined together, as indicated by arrow 66, with a high temperature press, adhesively, or by any suitable technique. In contrast, the exemplary embodiment of FIG. 14 illustrates the hose shaped continuous liner 46 formed from two distinct pieces of liner material. In this embodiment, a first end of the first piece of liner material and a first end of the second piece of liner material are joined via a high temperature press, or adhesively, or by any suitable technique, as indicated by arrow 68. Likewise, the second end of the first piece of liner material and the second end of the second piece of liner material are also joined via a heat press, as indicated by arrow 70. That is, a heat welding process may be used to form a hose shaped continuous liner from one or more pieces of liner material.

FIG. 15 illustrates another method of forming a hose shaped continuous liner from one or more pieces of liner material. In this embodiment, the ends of the pieces are joined together in a spiral pattern, as indicated by arrows 72. The ends may be heat welded or secure by adhesives or other connective devices.

In certain embodiments, the liner may be a simple right cylinder shape, or may be contoured in various ways, particularly at or near its ends. For example, the shell of the conduit may be tapered near its ends, with a generally larger internal cross-section in the middle than near the ends where the conduit is attached to the connectors. The liner, then, may be similarly shaped to match the taper of the outer structure. It has been found that the liner tends to inflate with the passage of air so as to conform to the inner surface of the outer shell, so that movement of the liner in the shell, both radial and axial, is effectively avoided, despite the "floating" attachment.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An air hose delivery assembly, comprising:
an external conduit; and
a continuous inner liner disposed within the external conduit and secured to the external conduit only at ends of the continuous inner liner to form a tubular structure configured to be collapsed to a flat structure.

2. The air hose delivery assembly of claim 1, wherein the ends of the continuous liner comprise a distance that is less than approximately 5% of the total length of the flat structure.

3. The air hose delivery assembly of claim 2, wherein a length of the flat structure is equal to approximately 15 feet.

4. The air hose delivery assembly of claim 3, wherein the distance is between approximately ⅛" and 8".

5. The air hose delivery assembly of claim 1, comprising an insulating layer disposed between the external conduit and the continuous inner liner.

6. The air hose delivery assembly of claim 5, wherein the insulating layer and the external conduit are secured together via double stitched webbing.

7. The air hose delivery assembly of claim 1, wherein the ends of the continuous inner liner is configured to be attached to an air delivery system, an aircraft, or a combination thereof.

8. The air hose delivery assembly of claim 1, wherein the continuous inner liner is made of CC580.

9. The air hose delivery assembly of claim 1, comprising connectors secured to ends of the external conduit and the continuous inner liner.

10. An air hose delivery assembly, comprising:
an outer layer with a first end; and
a continuous liner with a second end, wherein the continuous liner is joined with the outer layer exclusively via attachment of the first end to the second end.

11. The air hose delivery assembly of claim 10, wherein the second end of the continuous liner comprises a distance that is less than approximately 5% of the total length of a flat structure of the air hose delivery assembly.

12. The air hose delivery assembly of claim 10, wherein the first end is attached to the second end via a heat seal or stitching.

13. The air hose delivery assembly of claim 10, wherein the continuous liner is formed by folding one piece of liner material such that one edge of the piece is secured to another edge of the piece via a heat seal or adhesive, or both.

14. The air hose delivery assembly of claim 10, wherein the continuous liner is formed from at least two pieces of liner material, and wherein a first edge of a first piece of liner material is secured to a second edge of a second piece of liner material via a heat seal or adhesive, or both.

15. An inner layer for an air hose delivery assembly comprising:
a continuous liner configured to be secured to one or more additional layers only at ends of the continuous liner, and wherein the continuous liner is formed via sealing at least one edge of a piece of liner material to form a tubular structure that is configured to be collapsed to a flat structure.

16. The inner layer for an air hose delivery assembly of claim 15, wherein the sealing at least one edge comprises a heat welding process or an adhesive process, or both.

17. The inner layer for an air hose delivery assembly of claim 15, wherein the continuous liner is formed from CC580.

18. The inner layer for an air hose delivery assembly of claim 15, wherein the sealing at least one edge comprises disposing a connector lengthwise along an internal surface and/or an external surface of the edge of the piece of liner material.

19. The inner layer for an air hose delivery assembly of claim 15, wherein the sealing at least one edge of liner material comprises helically heat sealing or adhesively joining the at least one edge.

20. The inner layer for an air hose delivery assembly of claim 15, wherein the one or more additional layers comprises an external conduit, an insulating layer, or both.

* * * * *